United States Patent [19]
Fayoux et al.

[11] Patent Number: 5,900,150
[45] Date of Patent: May 4, 1999

[54] METHOD OF PURIFYING WASTE WATER BIOLOGICALLY

[75] Inventors: Christian Fayoux, Versailles; Jean-Marc Audic, Conflans Sainte Honorine, both of France

[73] Assignee: Lyonnaise Des Eaux-Dumez S.A., Nanterre, France

[21] Appl. No.: 08/269,577

[22] Filed: Jul. 1, 1994

[30] Foreign Application Priority Data

Jul. 2, 1993 [FR] France ................................. 93 08120

[51] Int. Cl.⁶ ........................................................ C02F 3/30
[52] U.S. Cl. ........................... 210/605; 210/612; 210/625; 210/903; 210/906
[58] Field of Search .................................. 210/605, 612, 210/624–626, 631, 903, 906

[56] References Cited

U.S. PATENT DOCUMENTS

| | | | |
|---|---|---|---|
| 4,009,099 | 2/1977 | Jeris | 210/612 |
| 4,042,494 | 8/1977 | Stoyer | 210/7 |
| 4,720,344 | 1/1988 | Gonczarczyk et al. | 210/625 |
| 5,185,080 | 2/1993 | Boyle | 210/612 |
| 5,540,839 | 7/1996 | Pirt | 210/624 |
| 5,651,891 | 7/1997 | Molof et al. | 210/605 |

*Primary Examiner*—Thomas G. Wyse
*Attorney, Agent, or Firm*—Amster, Rothstein & Ebenstein

[57] ABSTRACT

A method of purifying waste water biologically, in which at least one biological reaction is performed in at least one biological reactor containing microorganisms in activated sludge, and the waste water is separated from the activated sludge in a clarification basin, with at least a fraction of the activated sludge from said biological reactor being recirculated, wherein, prior to admitting the waste water to be treated into said biological reactor, at least a fraction of the polluting particles in suspension therein are separated out therefrom, the separated polluting particles are sent to a sludge activation reactor that is separate and disposed in parallel, the separating polluting particles are used as the main substrate for the development of microorganisms in strict aerobiosis, and the superactivated sludge obtained in this way is injected into the biological reactor(s).

7 Claims, 2 Drawing Sheets

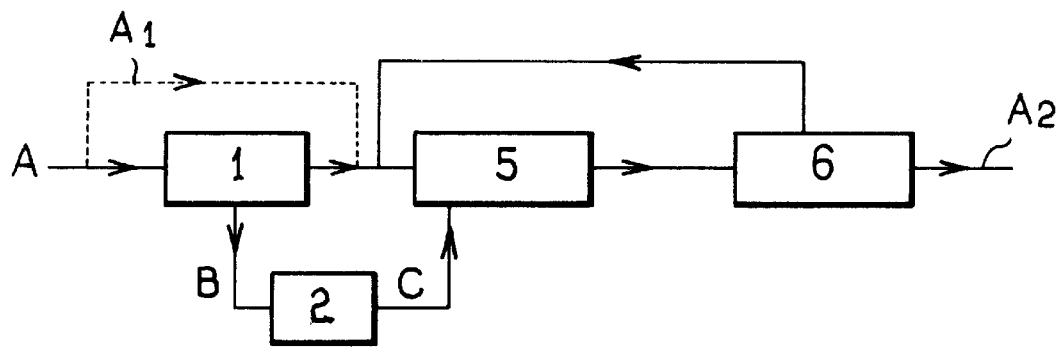
FIG_1
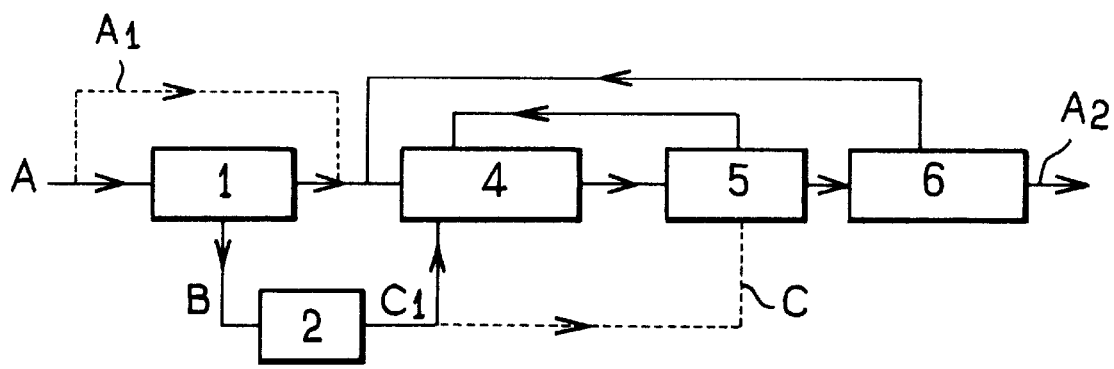
FIG_2
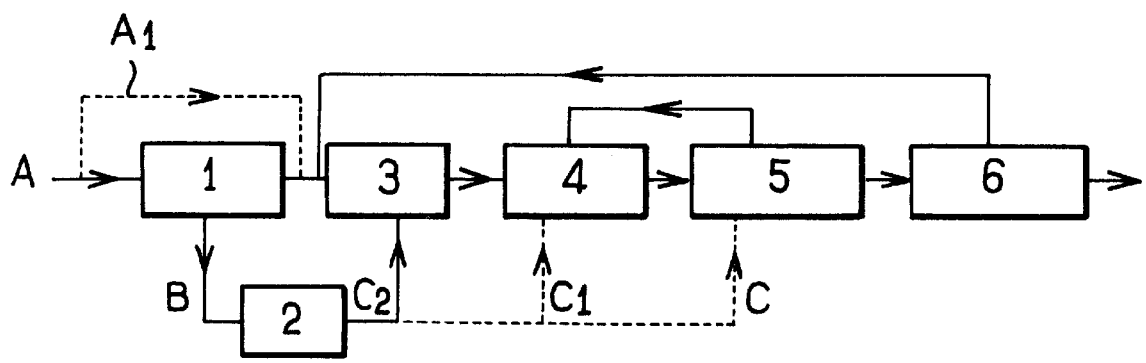
FIG_3

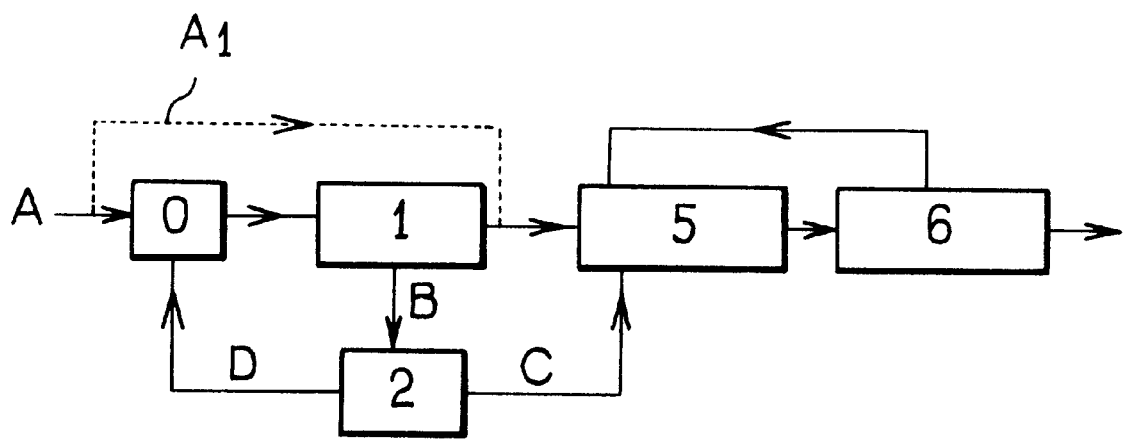
FIG_4
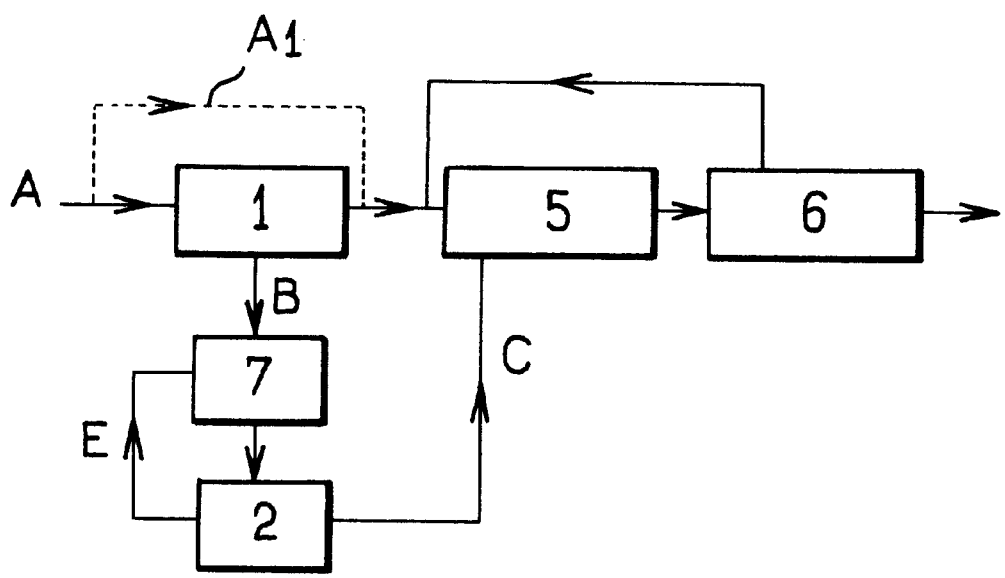
FIG_5

METHOD OF PURIFYING WASTE WATER BIOLOGICALLY

The invention relates to a method of purifying waste water biologically, in particular domestic, urban, or industrial waste water or any water containing pollutants or impurities in solution and in suspension, said pollutants and impurities being suitable for removal biologically.

BACKGROUND OF THE INVENTION

At present, waste water or sewage is purified essentially by a method consisting in causing a culture of bacteria dispersed in treatment basins to develop in the presence of oxygen (with such a culture also being known as a free culture or activated sludge), then, after sufficient contact, the purified water is separated from the sludge by sedimentation in a clarifier, with a fraction of the sludge being recirculated to one of the treatment basins in order to maintain a sufficient concentration of purifying bacteria therein while the remainder of the sludge, representing excess activated sludge, is removed from the installation. Such a purification method seeks both to eliminate organic carbon pollution and to oxidize nitrogen pollution by nitrification. By including periods of contact between the activated sludge and the water to be treated in the absence of aeration (anoxic contact) and in the presence of carbon, heterotrophic microorganisms are caused to degrade nitrates into gaseous nitrogen in order to perform denitrification. In addition, by subjecting the microorganisms to systemic alternation between anaerobic and aerobic conditions, it is possible to cause phosphor-containing compounds to accumulate in excess in the microorganisms, thereby giving rise to biological dephosphatization of the water being treated. Over the last 20 years, numerous variants of that method including various possible dispositions of anaerobic, anoxic, and aerobic zones have been developed and have given rise to numerous patents and publications. Unfortunately, it has been observed that in methods using activated sludge, the parameter limiting nitrification is not the reaction kinetics of transforming ammonia or organic nitrogen into nitrate, but the age (or real retention time) of the sludge which is necessary for conserving nitrifying microorganisms in the installation. As is known, the times required for forming such nitrifying microorganisms are very long and vary strongly with temperature: thus, at a temperature of 11° C., the sludge must be 10 days old, and it may be assumed that for temperatures below 11° C., the growth of such microorganisms is slowed down very considerably. In addition, these microorganisms which are obligate aerobes are capable of growing in an aerated zone only, so the retention time that needs to be taken into consideration is the time spent in the aeration basin. As a result, it is necessary to provide aeration basins of large volume that are overdimensioned relative to reaction rate.

If the age of the sludge is written A, the temperature of the biological basin in °C. is written T, and the daily production of excess sludge is written Px [kg of solids/day], then the mass of activated sludge, being aerated for nitrification purposes, Mba, is given by the following equation:

$$Mba = A*Px \quad (1)$$

with:

$$A = 4.5*0.914^{(T-20)} \quad (2)$$

which, according to the proposals of the German organization Abwasser Technischen Vereinigung E. V. (abbreviated below as ATV) gives rise to a daily sludge production Px of $$Px = 0.6*(MES+BOD_5) - [(0.072*0.6*K)/(1+0.08*K)]*BOD_5 \quad (3)$$

where:
  MES=daily throughput of solids admitted to biological treatment (in kg/day);
  $BOD_5$=daily throughput of 5-day biological oxygen demand admitted for biological treatment (in kg/day) with:

$$K = A*1.072^{(T-15)} \quad (4)$$

The dimensions of the aeration volume are then given by the following equation:

$$V = Mba/Cba \quad (5)$$

where:
  V=aeration volume ($m^3$)
  Mba=mass of activated sludge (kg)
  Cba=concentration of activated sludge ($kg/m^3$).

Several solutions have been proposed for reducing the aeration volume.

For example, it has been proposed to increase the concentration (Cba) of the biomass being aerated. If Qt is the through flow rate, Qr the recirculation flow rate, and Cr the concentration of the substance being recirculated, then the mass equilibrium equation for the sedimentation clarifier is as follows:

$$Qr*Cr = (Qt+Qr)*Cba \quad (6)$$

from which it can be deduced:

$$Cba = (Cr*Cr)/(Qt+Qr) \quad (7)$$

Since Cr is necessarily greater than Cba, the clarifier must therefore perform a thickening function to enable the concentration Cr to be achieved. However, the thickening concentration of a sludge is a function of thickening time (Tps) and of the mechanical characteristics of the sludge. Such mechanical characteristics can be expressed by the volume sedimentation index in ml/g (i.e. the volume occupied by 1 gram of sludge after 30 minutes of sedimentation), which mechanical characteristics are written below as ISV. As proposed by ATV, it is possible to write:

$$Tps = [(Cr*ISV)/(1000*K)]^3 \quad (8)$$

or:

$$Cr = K*(1000/ISV)*Tps^{1/3} \quad (9)$$

with:
  Tps=thickening time of sludge being clarified (hours)
  ISV=sludge volume index (ml/g)
  K is a constant equal to 0.6 or 0.7 depending on the sludge takeup technique.

Unfortunately, since the thickening of sludge in clarification takes place in the absence of added oxygen, if it is desired to avoid degrading treatment performance and the mechanical quality of the sludge then Tps must necessarily be less than, or at most equal to, the time the actived sludge spends in anaerobiosis. A Tps of 3 h is generally considered as being the maximum value. Consequently, in the presence of a very good ISV corresponding to 100 ml/g, the recirculation Cr cannot exceed 10 g/l if equation (9) is applied.

In addition, Qr is limited firstly by the volume of the clarifier allocated to thickening sludge, and secondly by problems of distributing energy at the inlet of the clarifier. For both of those reasons it is common to adopt a recycling ratio (where recycling ratio is defined as Qr/Qt) equal to 100% or rarely 150% of the raw water flow rate. Using the preceding example of an ISV of 100 ml/g and according to equation (7), the recycling ratio gives rise to a concentration of biomass in aeration Cba lying in the range 5 kg/m³ to 6 kg/m³, which is the concentration conventionally observed in water works.

Another means of increasing the concentration of the biomass in aeration is to use a system comprising firstly a "contact" basin where nitrogen in the form of ammonia is transformed into nitrates (nitrification) and secondly, on the sludge return circuit, a "stabilization" basin which enables a high value of sludge age to be obtained. Under such circumstances, the above-described constraints are found again, i.e. activated sludge concentration is equal to Cba in the contact basin and the concentration in the stabilization basin is equal to Cr, which represents only a small overall reduction in the volume of the works.

EP-A-0 309 352 describes a method in which obtaining the desired age for the sludge is performed in a generation basin located in a loop outside the reaction basins and wherein, prior to recycling the sludge through at least one purification process, a step of concentrating said sludge by floatation is performed upstream from the generation basin. That method makes it possible to achieve a considerable reduction in the volume of the Works in that the problem of obtaining aged sludge is treated in a basin that operates at high concentration (30 g/l) so the reaction basins can then be dimensioned as a function of reaction rates.

The essential problem in operating conventional activated sludge methods is that it is essential to obtain sludge having at least a minimum age while seeking high reaction rates, and this must be done in a reaction context which is favorable to neither of those two parameters. Studies have shown that those parameters and objectives are partially incompatible because the specific activity of sludge decreases with its age.

OBJECT AND SUMMARY OF THE INVENTION

The method of the invention enables the above incapability to be mitigated in that prior to inserting waste water to be treated into the biological reactor, at least a fraction of the polluting particles in suspension is separated therefrom, and the separated polluting particles are applied to a sludge superactivation reactor which is separate and disposed in parallel, the separated polluting particles being used as the main substrate for the development of microorganisms in strict aerobiosis, and the superactivated sludge obtained in this way is injected into the biological reactor.

The development of microorganisms in strict aerobiosis in the sludge superactivation reactor makes it possible to obtain superactivated sludge having high specific activity, and particularly suitable for eliminating carbon and nitrogen pollution and for biological dephosphatization in the reaction basins of conventional equipment for treating waste water by means of activated sludge. A particular advantage of the invention lies in obtaining operation of the purification installation using activated sludge under conditions limited only by the biological reaction kinetics of the reactions used in the various biological reactors, with this being independent of the constraints of maintaining sludge age, since that is achieved in a specific reactor that is independent from the water path and from the sludge path.

This independence of the reactor for superactivating sludge also sets it apart from the hydraulic conditions applied to the station, thus guaranteeing in said reactor, a) maintenance of high concentrations of substrates, and b) good control over the transit time of microorganisms under aerobic conditions, thereby having the following consequences:

a) The high concentration of substrate in the superactivation reactor makes it possible, because of the exothermal nature of the oxidizing reactions, to obtain temperatures (25° C. to 40° C.) in the reactor which are highly favorable to the development of microorganisms in general and in particular to the development of the nitrification microorganisms. Thus, if equation (2) is applied, the sludge age that needs theoretically to be maintained in the reactor in order to obtain development of the nitrification microorganisms lies in the range 2.8 days to 1 day for temperatures lying in the range 25° C. to 35° C.

b) By keeping the biological culture permanently in strict aerobiosis in the superactivation reactor, it is possible to obtain optimum conditions for growth of the strict aerobic microorganisms (such as the autotrophic microorganisms that perform nitrification), and to exert selection on microorganisms that are obligate anaerobes, or optional anaerobes. In addition, the power of the biological reactions implemented gives rise to considerable degradation of the substrate (about 35% to 50% of organic matter is eliminated) and thus of polluting particles, thereby reducing sludge production by 20% to 30%.

A method of purifying water biologically may be implemented in various different ways, of which the following are cited by way of example:

a mere step of oxidizing the carbon pollution, performed in a biological reactor operating under aerobic conditions;

a step of oxidizing the carbon pollution plus a step of nitrification which take place under aerobic conditions and generally in the same biological reactor;

a step of oxidizing the carbon pollution, a step of nitrification, and a step of denitrification which can be performed in the same biological reactor, the first two steps taking place under aerobic conditions while the last step takes place under anoxic conditions, the reactor operating alternately in aerobiosis and in anoxia;

a step of oxidizing the carbon pollution, a step of nitrification, and a step of denitrification, the denitrification step taking place in anoxia in a biological reactor that is distinct from the reactor for oxidizing and for nitrification, and that is situated upstream therefrom and through which a fraction of the contents of the oxidizing and nitrification reactor is recycled; and a step of oxidizing the carbon pollution, a nitrification step, a denitrification step, and a dephosphating step, the dephosphating step taking place in an anaerobic biological reactor which is situated upstream from the denitrification reactor and in which there is recycled the waste water separated from the activated sludge which is collected at the end of the system.

In all cases, the superactivation reactor is placed in parallel between the separator and the first biological reactor, and the superactivated sludge it produces is injected into at least one of the subsequent biological reactors, either continuously or discontinuously.

In order to improve the efficiency with which polluting particles are captured, a biosorption reactor is used situated upstream from the polluting particles separator, with the water to be treated being put into contact in said biosorption reactor with the superactivated sludge coming from the superactivation reactor. In another variant, the nitrates formed in the superactivation reactor can be eliminated by implementing an anoxic reactor situated between the polluting particle separator and the superactivation reactor.

In yet another variant, additional substrate may be added in the super activation reactor in order to acclimatize the superactivated sludge to eliminating particular pollution, or for the purpose of increasing the specific activity of said sludge.

The superactivation reactor may also be used as a storage tank, and the various biological reaction basins are then fed with superactivated sludge only as a function of requirements, e.g. during peak periods, so as to obtain a better ratio between pollution flow and biomass.

One of the advantages of implementing the method of the invention is that it is possible to increase very significantly the retention time of activated sludge through the clarification reactor without fear of degrading the quality of the sludge by anaerobiosis. This is due firstly to the thorough elimination of organic matter from the activated sludge due to the use of superactivated sludge, and secondly to the strictly aerobic conditions that are maintained in the super-activation reactor. As a result, the following are obtained: ISV=80 and Tps=6. If equation (9) is applied, a concentration of recirculation product Cr is found of the order of 15 kg/m$^3$, which for a recirculation ratio of 150% makes it possible, according to equation (7), to maintain a concentration Cba of the order of 9 kg/m$^3$ in the reaction basins.

BRIEF DESCRIPTION OF THE DRAWINGS

Other characteristics and advantages of the present invention appear on careful reading of the examples given purely by way of non-limiting illustration and described with reference to FIGS. 1 to 5 which are diagrams showing water purification schemes of the present invention.

In the figures, identical reference numerals relate to identical elements.

MORE DETAILED DESCRIPTION

In FIG. 1, there can be seen a scheme for a water purification station using a superactivation reactor of the present invention.

All or a fraction of the effluent to be treated A is admitted into a phase separator 1. When a fraction is admitted, then the remaining portion Al of the effluent does not pass into the separator 1. In the separator 1, polluting particles are recovered using various possible systems, dynamically or statically. The effluent to be treated, with at least some of its polluting particles removed therefrom, is sent to a reaction basin 5 where it is put into contact with activated sludge and from which, after the retention time necessary for obtaining the biological reaction(s), it is sent to the clarifier 6 where it is separated into an effluent A2 that satisfies the looked-for discharge standards and activated sludge which is recirculated to the reaction basin 5. The polluting particles B leave the phase separator 1 and are directed to a superactivation reactor 2 in which the microorganisms develop in aerobiosis. The superactivated sludge C coming from the reactor 2 is injected into the reaction basin 5 in continuous or discontinuous manner.

The reaction basin 5 can operate under aerobic conditions so as only to oxidize the carbon pollution;

under aerobic conditions so as both to oxidize the carbon pollution and simultaneously to nitrify the ammonia nitrogen and the organic nitrogen; and under aerobic conditions both to oxidize the carbon pollution and to nitrify, followed by operation under anoxic conditions to eliminate nitrogen by denitrification.

The scheme shown in FIG. 2 differs from the scheme shown in FIG. 1 by the addition of a denitrification reaction basin 4 disposed upstream from the reaction basin 5 in Which the carbon pollution is then oxidized and the nitrogen is nitrified, together possibly with additional denitrification by switching to anoxic conditions. The fraction of the contents of the basin 5 that has been subjected to oxidizing of the carbon pollution and to nitrification is recirculated to the basin 4 for denitrification. The superactivated sludge coming from the superactivation basin 2 can be injected in continuous or discontinuous manner into the reaction basin 5 (sludge C) or into the denitrification basin 4 (sludge C1 ).

FIG. 3 is a scheme similar to that of FIG. 2, to which there is added a biological dephosphating basin 3 disposed upstream from the denitrification basin 4, itself disposed upstream from the reaction basin 5. As before, the reaction basin 5 oxidizes the carbon pollution and performs nitrification of the nitrogen by operating under aerobic conditions, and possibly also additional denitrification by operating under anoxic conditions. The superactivated sludge formed in the superactivation reactor 2 may be injected in continuous or discontinuous manner into the reaction basin 5 (sludge C), into the denitrification basin (sludge C1) or into the dephosphating basin 3 (sludge C2).

The scheme in FIG. 4 shows a variant of the method shown in the scheme of FIG. 1, however the variant shown in FIG. 4 could also be applied to the treatment scheme of FIGS. 2 and 3.

Prior to insertion of waste water to be treated A in separator 1, with or without a bypass fraction A1, the water A is treated in a biosorption reactor O in which it is put into contact with superactivated sludge D coming from the superactivation reactor 2. This makes it possible to improve the efficiency with which polluting particles are captured because of the bioflocculation effect that occurs in the reactor O.

FIG. 5 shows a variant of the method shown in FIG. 1, however this variant could equally well be applied to the schemes shown in FIGS. 2, 3, and 4.

The variant in Figure 5 consists in providing a predenitrification step in a predenitrification basin 7 situated between the phase separator 1 and the superactivation reactor 2.

In the reactor 7, the polluting particles B are put into contact with superactivated sludge E containing nitrates and coming from the superactivation reactor 2. This variant makes it possible to eliminate at least a fraction of the nitrates formed while the microorganisms are growing in the superactivation reactor 2.

The following examples serve to illustrate the advantages provided by the present invention, and in particular the percentage volume saving obtained in the works when implementing a sludge superactivation reactor situated in parallel with the water-plus-sludge path.

The examples apply to an installation corresponding to the scheme of FIG. 1 (only one reaction basin in which the carbon pollution is oxidized, and also a nitrification/denitrification step), and the waste water treated had the following basic parameters:

| | |
|---|---|
| flow of water to be treated | 10,000m$^3$/day |
| daily throughput of BOD$_5$ | 3,000kg/day |
| daily throughput of solids | 3,500kg/day |
| daily throughput of NTK | 600kg/day |
| minimum temperature | 11° C. | where NTK is total nitrogen measured using the Kjeldahl technique.

EXAMPLE 1A

Conventional treatment without primary sedimentation
Sludge age from equation (2): 10 days.
Production of excess sludge from equation (3): 3,725 kg/day.
Mass of activated sludge in aeration: 3,725 * 10=37,250 kg
Maximum possible IVS 150 ml/g and Tps=3 hours.
Maximum recirculation concentration from equation (9): 6.3 kg/m$^3$.
Maximum recirculation ratio 150% ⇒ 630 m$^3$/h.
Maximum clarification speed 0.7 m/h ⇒ 1,100 m$^2$.
Clarification volume 1,100+(630*3)=3,000 m$^3$.
Activated sludge concentration from equation (7): 3.8 kg/m$^3$.
Aeration volume from equation (1)≈10,000 m$^3$.
Volume for denitrification, 30% of aeration volume=3,000 m$^3$.
Total volume of reaction basin 10,000+3,000=13,000 m$^3$.
Total volume of works 13,000+3,000=16,000 m$^3$.

EXAMPLE 1B

Conventional treatment with primary sedimentation
Average speed applied to primary sedimentation means: 0.9 m/h.
Primary sedimentation volume≈1,400 m$^3$.
Reduction of solids due to primary sedimentation≈50%.
Reduction of BOD$_5$≈35%.
Reduction of NTK≈9%.
Throughput of solids admitted to biological treatment: 1,750 kg/day.
Throughput of BOD$_5$ admitted to biological treatment: 1,950 kg/day.
Throughput of NTK admitted to biological treatment: 546 kg/day.
Sludge age from equation (2): 10 days.
Production of excess sludge from equation (3): 1,822 kg/day.
Mass of activated sludge in aeration 1,822*10=18,220 kg.
Maximum possible IVS 180 ml/g and Tps=3 hours.
Maximum recirculation concentration from equation (9): 5.3 kg/m$^3$.
Maximum recirculation ratio 150%, ⇒ 630 m$^3$/h.
Maximum clarification speed 0.7 m/h ⇒ 1,100 m$^2$.
Clarification volume 1,100+(630*3)=3,000 m$^3$.
Activated sludge concentration from equation (7): 3.2 kg/m$^3$.
Aeration volume from equation (1)≈5,700 m$^3$.
Volume for denitrification, 35% of aeration volume=5,700*0.35≈2,000 m$^3$.
Total volume of reaction basis 2,000+5,700=7,700 m$^3$.
Total volume of works 7,700+3,000+1,400=12,100 m$^3$.
Total production of sludge 1,750+1,822=3,572 kg.

EXAMPLE 1 C

Treatment installation using a superactivation reactor of the present invention
Average speed applied to primary sedimentation means: 0.9 M/h.
Primary sedimentation volume≈1,400 m$^3$.
Reduction of solids due to primary sedimentation≈50%.
Reduction of BOD$_5$ ≈35%.
Reduction of NTK≈9%.
Age of sludge from equation (2) at 25° C.: 2.8 days (we use a value of 4 days).
Production of superactivated sludge: 1,250 kg/day.
Mass of superactivated sludge in the reactor 1,250 * 4=5,000 kg.
Volume of superactivation reactor 5,000/20=250 m$^3$.
Throughput of solids admitted to biological treatment: 1,750 kg/day.
Throughput of BOD$_5$ admitted to biological treatment: 1,950 kg/day.
Throughput of NTK admitted to biological treatment 546 kg/day.
Throughput of superactivated sludge: 1,250 kg/day.
Nitrification speed : 3.5 mg N-NO$_3$ nitrified per gram of superactivited sludge per hour.
Production of excess sludge from equation (3): 1,822 kg/day.
Nitrogen in biological synthesis: (1,250+1,822)*5%=154 kg/day.
Nitrogen to be nitrified : (600−154−10,000*0.05)=396 kg/day.
Mass of superactivated sludge for nitrification 396/(0.0035 * 24)=4,715 kg.
Retention time of superactivated sludge through biological treatment : 3.77 days.
Total mass of activated sludge: ( 1,250+1,822) * 3.77=11,581 kg.
Denitrification speed : 2 mg N-NO$_3$/g of superactivated sludge/h.
Mass of nitrogen to denitrify (396−10,000*0.010)=296 kg/day.
Mass of activated sludge for denitrification 296/(0.002*24)= 6,166 kg.
Maximum possible IVS 100 ml/g and Tps=4 hours.
Maximum recirculation concentration from equation (9): 10.4 kg/m$^3$.
Maximum recirculation ratio: 150%.
Concentration of activated sludge from equation (7): 6.2 kg/m$^3$.
Maximum clarification speed 0.7 m/h ⇒ 1,100 m$^2$.
Clarification volume 1.100 (630*4)=3,620 m$^3$.
Volume of reaction basin (1): 11,581/6.2≈1,868 m$^3$.
Total volume of works: 1.868+3,620+250+1,400=7,138 m$^3$.
Total production of sludge: 1.250+1,822=3,072 kg/day.

It can be seen that there is no difficulty in obtaining a reduction in the volume of the works that may be as great as 40% to 50% depending on the starting path used.

We claim:

1. A method of purifying waste water biologically, in which at least one biological reaction is performed in at least one biological reactor containing microorganisms in activated sludge, and the treated water is separated from the activated sludge in a clarification basin, with at least part of the activated sludge being recirculated to said biological reactor, wherein prior to inserting the waste water to be treated into said biological reactor, at least a fraction of the polluting particles in suspension therein are separated out therefrom, and the separated polluting particles are applied to a sludge superactivation reactor which is separated and disposed in parallel, said separated polluting particles are used as the main substrate for the development of microorganisms in strict aerobiosis at a temperature of 25° C. to 40° C., and the superactivated sludge obtained in this way is injected into at least one biological reactor in which a nitrification step takes place.

2. A method according to claim 1, wherein a biological reactor is used in which carbon pollution is oxidized and a nitrification step is performed.

3. A method according to claim 2, wherein, between the step of separating at least a fraction of the polluting particles and the biological reaction in the biological reactor, there is interposed a denitrification step in a denitrification reactor in which superactivated sludge obtained in the super-activation reactor is injected.

4. A method according to claim 2, wherein the biological reactor is operated under alternating conditions of aerobiosis and of anaerobiosis.

5. A method according to claim 3, wherein, between the step of separating at least a fraction of the polluting particles and the denitrification step, there is interposed a biological dephosphating step in a biological dephosphating reactor in which superactivated sludge obtained from the superactivation reactor is injected.

6. A method according to claim 1, wherein, prior to separating out at least a fraction of the polluting particles from the water to be treated, a bioflocculation step is performed in a biosorption reactor by putting the water to be treated into contact with superactivated sludge coming from the superactivation reactor.

7. A method according to claim 1, wherein, between the step of separating at least a fraction of the polluting particles and the superactivation step, there is interposed a denitrification step in a denitrification reactor in which the superactivated sludge obtained in the superactivation reactor is injected.

* * * * *